(12) United States Patent
Forget et al.

(10) Patent No.: US 8,524,031 B2
(45) Date of Patent: Sep. 3, 2013

(54) LINING METHOD AND LINING INSTALLATION FOR THE PRODUCTION OF MULTI-LAYER PRODUCTS

(75) Inventors: Luc Forget, Lentzweiler (LU); Alexandre Siche, Wiltz (LU)

(73) Assignee: Tarkett SAS, Nanterre (FR)

( * ) Notice: Subject to any disclaimer, the term of this patent is extended or adjusted under 35 U.S.C. 154(b) by 1427 days.

(21) Appl. No.: 10/596,142

(22) PCT Filed: Dec. 3, 2004

(86) PCT No.: PCT/EP2004/053266
§ 371 (c)(1), (2), (4) Date: May 31, 2006

(87) PCT Pub. No.: WO2005/053957
PCT Pub. Date: Jun. 16, 2005

(65) Prior Publication Data
US 2007/0039693 A1   Feb. 22, 2007

(30) Foreign Application Priority Data
Dec. 4, 2003   (EP) ..................... 03293039

(51) Int. Cl.
*B32B 37/06* (2006.01)
(52) U.S. Cl.
USPC ........................ 156/309.9; 156/322
(58) Field of Classification Search
USPC .............. 156/308.2, 309.6, 309.9, 82, 322, 156/324, 381, 497, 499; 428/95, 96
See application file for complete search history.

(56) References Cited

U.S. PATENT DOCUMENTS

| | | | | |
|---|---|---|---|---|
| 3,829,343 A | * | 8/1974 | Remmert | 156/249 |
| 4,384,904 A | * | 5/1983 | Kauffman et al. | 156/78 |
| 4,872,930 A | * | 10/1989 | Kajikawa et al. | 156/72 |
| 5,278,275 A | * | 1/1994 | Yatsuka et al. | 528/74 |
| 5,728,476 A | * | 3/1998 | Harwood et al. | 428/500 |
| 6,114,046 A | * | 9/2000 | Hanoka | 428/515 |
| 6,287,706 B1 | | 9/2001 | Simpson et al. | |

FOREIGN PATENT DOCUMENTS

| | | | |
|---|---|---|---|
| EP | 1 004 432 A2 | | 5/2000 |
| JP | 57025315 A | * | 2/1982 |
| JP | 05 004248 | | 1/1993 |
| JP | 05004248 A | * | 1/1993 |

OTHER PUBLICATIONS

WO 97/27259 Jul. 1997 Lee et al.*
WO 01/03921 Jan. 2001 Delisio et al.*
"Polyethylene: Production and Properties & Uses" Ausetute available as of Jun. 2002 as evidenced by the internet archive.*
Machine translation of JP 05004248 date unknown.*
Abstract only for JP 05004248, Publication date Jan.14, 1993.

* cited by examiner

*Primary Examiner* — John Goff
(74) *Attorney, Agent, or Firm* — Norris McLaughlin & Marcus, PA

(57) ABSTRACT

The invention relates to a lining method and a lining installation for the production of multi-layer products which are used, for example, to produce floor or wall coverings or interior trim for passenger transport vehicles, such as cars, railroad cars, ship cabins and aircraft cockpits.

8 Claims, 1 Drawing Sheet

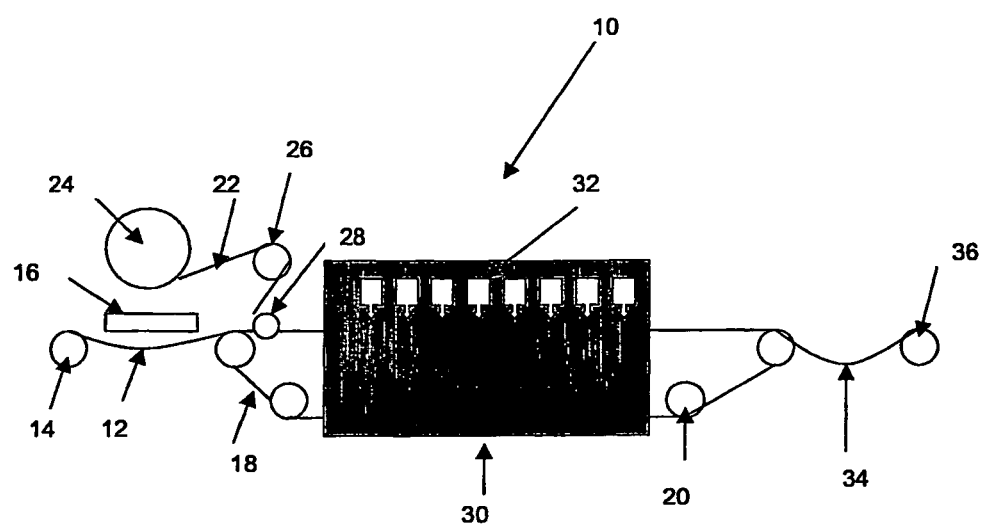

LINING METHOD AND LINING INSTALLATION FOR THE PRODUCTION OF MULTI-LAYER PRODUCTS

The invention relates to a doubling method as well as to a doubling equipment for manufacturing multilayer products, notably used for making floorings or wall claddings, as well as for the interior trim of vehicles used for person transportation, such as automobiles, railway wagons, ship cabins and aircraft cockpits.

Multilayer products comprising a polymeric backing and a wear layer containing copolymer of the ionomer type are particularly targeted.

For making floorings and wall claddings, as well as trims for passenger compartments of vehicles, sheet multilayer products are currently used, which comprise a backing layer or substrate and a wear surface layer. The backing layer generally has a decorative face onto which the wear layer is applied. The latter is used for protecting the decorative face of the substrate. It is usually transparent and should have adequate resistance to mechanical aggressions (impacts, abrasion) and to chemical aggressions under normal conditions of use. These functions of multilayer products condition the selection of the materials used for making them. This selection is further conditioned by sanitary, environmental and application considerations. In particular, the multilayer products should adapt to being applied by rolling or thermoforming which involves the use of thermoplastic polymers. Adherence of the superimposed layers should be sufficient for providing cohesion of the multilayer products in the applications for which it is intended. It is further desirable to select materials which allow recycling of the used multilayer products. Moreover, exudation of volatile materials (such as plasticizers) should be avoided or limited during the use of these multilayer products.

Polyvinyl chloride (PVC) has been used for a long time for manufacturing sheet multilayer products intended for making carpets or wall claddings or trims for vehicle passenger compartments. However, considerations related to the protection of the environment argue for replacement of polyvinyl chloride with chlorine-free polymers or copolymers. Quite naturally, the selection was directed towards olefinic polymers and copolymers, especially polymers and copolymers of ethylene and propylene, given their relatively low price cost and their good chemical and thermal properties.

A disadvantage of olefinic polymers in such applications lies in the difficulties encountered upon doubling the individual layers in order to form a multilayer product. Indeed, olefinic products badly lend themselves to rolling as the products tend to adhere to the rolling cylinders.

The technique conventionally used in PVC floorings, i.e., a coating followed by gelation is not feasible in the case of olefinic and/or ionomer products.

The invention is directed to creating a new technique for doubling sheets in order to obtain a multilayer product having sufficient adherence between the layers which make it up and a high quality surface aspect.

Accordingly, the invention relates to a method for manufacturing multilayer products comprising, on a polymeric substrate, at least one wear thermoplastic polymer layer. The method is characterized by the following steps:
  preheating the backing, preferably at a temperature between 100 and 130° C.,
  cold application of the wear layer on the preheated backing,
  melting the wear layer on the backing, to ensure that it adheres with the backing, preferably at a temperature between 120° C. and 180° C.,
  cooling the obtained product to bring it to a temperature closed to room temperature.

By means of this method, it is possible to obtain a multilayer product with good physical and chemical properties, notably as regards internal cohesion, adherence of the layers which make it up, heat properties, mechanical resistance to wear and impacts, resistance to chemical aggressions and transparency of the wear surface layer. The thereby obtained product has a high quality surface aspect.

One of the advantages of this method lies in the fact that the wear layer is coldly applied (not preheated—at room temperature) and it is not in contact with the rolling cylinders. The aspect problems of surfaces resulting from localized adherence on the rolling cylinder are thereby avoided. Instead of exerting the required pressure for joining and firmly attaching the backing and the wear layer by a rolling cylinder or any other comparable device, adherence of the wear layer is obtained by melting the latter, performed in an oven by blowing hot air on the upper surface of the product. In practice and for economical reasons, air is used as a gas, preferably preheated air at a temperature close to that prevailing inside the oven. For particular applications, the use of inert gases such as nitrogen or oxygen-depleted air may also be contemplated in order to minimize possible oxidization reactions.

The wear layer is not preheated before it is applied onto the backing which itself is preheated. An advantage of applying the cold wear layer (at room temperature) is that its handling is easier since the wear layer is not softened by heat only up to the moment when it enters in contact with the preheated backing. In fact the wear layer is a sheet or a film which is applied onto the backing and is not a molten mass which is spread out on the backing.

It is also important to note that the wear layer is melted in a controlled way only during the passing in the oven and not before contact with the backing. Consequently, the gas pressure applied on the surface of the wear layer does not risk generating surface defects appearing in the finished product.

This method is particularly well suited for manufacturing multilayer products with a large width (±4 m) comprising on a polymeric substrate, a polymeric wear layer of the ionomer or PO type. The products may further comprise between the substrate and the wear layer, an intermediate layer of an olefinic polymer containing a metallocene.

The backing of the multilayer products has the function of being used as a mechanical backing. It may include a decorative imprint on one of its faces or on both of its faces. The imprint may also be made on the wear layer if the latter is transparent. The backing may also comprise a mineral filler. It essentially comprises a polymeric, generally olefinic compound. The polymeric compound may be an olefinic homopolymer or copolymer.

Subsequently, for reasons of simplification, the expression "polymer" will equally designate a homopolymer or a copolymer.

The olefinic polymer entering the composition of the backing of the products according to the invention may be selected from polymers of ethylene, propylene, and butylene. It may be a homopolymer or a copolymer, for example a copolymer of ethylene and propylene, or a copolymer of ethylene and butylene. Standard polyethylenes and/or metallocene polyethylenes are preferred. High density polyethylenes (HDPE), low density polyethylenes (LDPE), linear low density polyethylenes (LLDPE) and linear very low density polyethylenes (VLDPE) are particularly recommended.

In the multilayer products, the olefinic polymer of the backing is advantageously free of ionic bonds. By the expression "free of ionic bonds", it is meant that the number of carboxylic acid groups in the polymer does not exceed 25% and is for example between 0 and 15%.

The polymer of the backing may comprise mineral fillers intended to give it particular mechanical properties. Mineral fillers which may be used in the backing comprise calcium carbonate, magnesium carbonate, calcium sulfate, barium carbonate, barium sulfate, kaolin, pyrogenated silica, aluminum hydrate and expansed graphite.

The wear layer has the function of protecting the backing against mechanical and chemical aggressions in the applications for which the multilayer products according to the invention are intended. It preferably comprises a polymer of the ionomer type.

Polymers of the ionomer type for the wear layer are well known in the arts. These are copolymers with ionic bonds, comprising a hydrocarbon chain containing carboxylic acid side groups partially or totally neutralized by cations. The hydrocarbon chain is an olefinic, for example ethylenic chain. The carboxylic acid groups for example comprise ethylenically $\alpha$ and $\beta$-unsaturated carboxylic acids and the cations may for example comprise metal cations or amine cations. Further information concerning the copolymers of the ionomer type is notably accessible in documents FR-A-1 430 478, U.S. Pat. No. 3,264,272 and U.S. Pat. No. 3,322,734 as well as in the article, "The structure and properties of ionomers"—W. J. Machnight and T/R Earnest Jr., published in Macromolecules Reviews, Vol. 16, pages 41-122 (1981).

The optimum thickness of the wear layer depends on several parameters such as the material used for said wear layer and the applications for which the multilayer products are intended. In practice, good results are generally obtained with wear layers having a thickness of at least 30 µm (preferably 60 µm), thicknesses between 40 and 300 µm being particularly advantageous.

Alternatively, the wear layer may be coated with a surface layer of polyurethane in order to strengthen abrasive wear resistance.

The wear layer may comprise one or more intermediate layers of an olefinic polymer containing a metallocene. This intermediate layer is fixed on the wear layer so that it is located between the backing and the wear layer in the finished product. Advantageously, this intermediate layer is transparent.

Advantageously, the intermediate layer comprises an olefinic polymer which may equally be a homopolymer or a copolymer. Homopolymers are well suited. Homopolymers of ethylene are preferred and among the latter, low density polyethylenes (LDPE) are particularly recommended.

In the multilayer products, the intermediate layer(s) may comprise a single olefinic polymer or a mixture of different olefinic polymers, according to the previous definition. Subsequently, unless stated otherwise, the expression "olefinic polymer of the intermediate layer" will equally designate a single olefinic polymer or a mixture of at least two different olefinic polymers, the polymer or each polymer may equally be a homopolymer or a copolymer.

In the wear layer, the olefinic polymer of the intermediate layer also has the function of allowing wear layers to be made as sheets or films by the extrusion blow molding technique or of improving their performances. More particularly, in the application of this extrusion blow molding technique, bubbles of large dimensions and of sufficient thickness may be stabilized.

The wear layer thereby obtained as a sheet, may therefore comprise an external layer of a product which is used for forming the surface layer of the multilayer product, an intermediate layer of an olefinic polymer, optionally, comprising additives such as fatty acids and/or silica, and a layer in an olefinic polymer comprising a metallocene.

"Metallocene" designates polyolefins respectively polyethylenes made with metallocene catalysts which are well known in the art. The metallocene which may be used is advantageously selected from polyolefines and more particularly from polyethylenes having a density less than 0.900. The multilayer products may comprise a single metallocene or a mixture of different metallocenes, according to the previous definition. Subsequently, unless stated otherwise, the expression "metallocene" will equally designate a single metallocene or a mixture of at least two different metallocenes.

In multilayer products, the metallocene has the function of achieving an even more effective adherence of the intermediate layer to the wear layer and to the backing. For this purpose, it is present in the intermediate layer in an amount which is preferably larger than 1 part (more preferably 5 parts) by weight for 100 parts by weight of olefinic polymer. Advantageously, at least 5 parts (preferably at least 15 parts) by weight of metallocene for 100 parts by weight of olefinic polymer are used.

However an exaggerated amount of metallocene should be avoided under the penalty of damaging the stability of the bubble when the wear layers according to the invention are made by the extrusion blow molding technique. Generally, it is recommended that the amount of metallocene in the olefinic polymer of the intermediate layer should not exceed 40 parts by weight for 100 parts by weight of polymer and be preferably less than 30 parts by weight of 100 parts by weight of the olefinic polymer. Amounts of metallocene from 5 to 20 (preferably from 8 to 15) parts by weight for 100 parts by weight of olefinic polymer are generally suitable.

The metallocene may be introduced into the olefinic polymer of the intermediate layer as a filler. In a particular embodiment of the multilayer wear layers, an additional layer of low density polyethylene (LDPE) is interposed between the backing and the aforementioned intermediate layer. This additional layer may also contain fatty acids, and/or silica. These additives improve adherence of the intermediate layer to the backing on the one hand and facilitate extrusion by blow molding on the other hand.

The polymers entering the composition of the multilayer wear layers may possibly contain additives commonly present in multilayer products in order to provide them with particular properties or to facilitate their application, for example lubricants, plasticizers, pigments or foaming agents.

The multilayer wear layers combine a set of interesting properties, previously considered as being incompatible, in particular high resistance to abrasive wear and to other mechanical aggressions, high resistance to chemical aggressions, and great cohesion.

The invention consequently also relates to a doubling equipment comprising a backing feeder device, a backing preheating station, a device for feeding a wear layer as a sheet or a film, a device for bringing the backing and the wear layer into contact, a heating oven comprising one or more gas blowing nozzles, as well as a conveyor device, conveying the backing and wear layer through said heating oven. The backing is conveyed via the feeding device—which may be a roll unwinder—for example in the preheating station in which it is preheated to a temperature between 100 and 130° C. The preheating station may for example be an infrared radiation oven.

The preheated backing is then put into contact with the wear layer in the contacting device after having been conveyed by the wear layer feeder device. It should be noted that the device for putting the wear layer and the backing into contact exerts a certain pressure on the upper surface of the wear layer, notably for minimizing the trapping of air between the backing and the wear layer.

The contacting device is advantageously a pressure cylinder which presses the wear layer which is at room temperature onto the preheated backing. Preferably, the pressure cylinder is located above the conveyor device which brings the backing and the wear layer into the oven. As the conveyor device is flexible, it may be asserted that the wear layer is applied onto the backing with a low pressure between 100 and 1,000 g/cm². Considering that the wear layer is not preheated, this operation will not generate surface defects. However, as the backing is preheated and its surface is consequently softened, the backing has a certain level of adhesivity and a certain viscosity and thus the wear layer applied against the backing will adhere thereto.

The backing onto which the wear layer is applied, is then conveyed through the heating oven inside which the wear layer—backing assembly is heated to a temperature between 120° C. and 180° C. on the conveyor device. During this transport, the wear layer is melted and slight pressure is exerted on the backing-wear layer assembly, by means of the nozzle blowing gas—preferably hot gas.

With the equipment according to the invention, it is possible to obtain products coated with a multilayer wear layer of large dimensions, the width of which may attain several meters. More particularly, with the equipment according to the invention, it is possible to manufacture products in strips, the width of which exceeds 4 m, with a thickness of the wear layer exceeding 60 μm and which may attain 200 μm or even more.

The obtained products find multiple applications. They find applications in the building industry, for making carpets, fitted carpets, and wall claddings. They are also used in the automobile industry, aircraft, ships and railways, for making fitted carpets as well as for covering walls of passenger compartments, cockpits and cabins of vehicles.

Accordingly, the invention also relates to the use of products according to the invention for making floor or wall claddings as well as for covering walls of vehicle passenger compartments, especially of vehicles intended for person transportation.

The description which follows of the single FIGURE of the appended drawing illustrates a particular embodiment of the equipment according to the invention.

Reference 10 indicates the doubling equipment. The backing 12 is unwound from the storage roll 14 and is led under an infrared lamp 16 where the backing is heated to a temperature of about 120° C. so as to soften its upper surface. The preheated backing is then laid on a conveyor belt 18 with which it may be conveyed through the oven. The conveyor belt 18 is stretched on a series of rolls 20 which cause it to advance and which maintain it under a certain tension.

The wear layer 22 is also unwound from its storage roll 24 and is brought into a spreader 26 in order to obtain a smooth product without any folds or other surface defects. The wear layer is then guided above the conveyor belt 18 and is put into contact with the preheated backing by means of a pressure cylinder 28 which exerts low pressure on the backing 12 and the wear layer 22 so as to minimize the trapping of air between both of them.

The backing 12 and the wear layer 22 are then conveyed through the heating oven 30, inside which the backing-wear layer assembly is heated to a temperature between 120 and 180° C. During this transport, the dwelling time inside the oven is from 2 to 3 minutes, the wear layer is melted by means of preheated gas injected above the conveyor belt 18 by means of blowing nozzles 32 set up in the upper portion of the oven 30. The gases heat the backing and the wear layer and melt them together so as to obtain suitable cohesion between the wear layer and the backing upon exiting the oven 30. After cooling, the obtained product 34 is wound onto a storage roll 36.

The invention claimed is:

1. A method for making a multilayer product comprising an olefinic polymeric backing selected from the group consisting of homopolymers or copolymers of ethylene, propylene and butylene, and at least one wear layer comprised of ionomeric copolymers, the wear layer having a top surface and a bottom surface, wherein the method consists essentially of the following steps:
   preheating the backing at a temperature between 100° C. and 130° C.,
   cold application of the bottom surface of the wear layer on the preheated backing without using a rolling cylinder to make a wear layer-backing assembly,
   attaching the backing to the wear layer without using a rolling cylinder by melting the wear layer at a temperature between 120° C. and 180° C. by means of blowing nozzles blowing pre-heated gas, the preheated gas exerting pressure on the wear layer in order to ensure that it adheres with the backing, and
   cooling to bring the product to a temperature close to room temperature.

2. The method of claim 1 wherein the bottom surface of the wear layer further comprises a layer comprised of a composition selected from the group consisting of olefinic polymers containing a metallocene, olefinic homopolymers and olefinic copolymers.

3. The method of claim 2 wherein the bottom surface of the wear layer is comprised of low density polyethylene.

4. The method of claim 1 wherein the wear layer further comprises a top coated surface of polyurethane.

5. The method of claim 2 wherein the wear layer further comprises a top coated surface of polyurethane.

6. The method of claim 1 wherein the olefinic polymeric backing is selected from the group consisting of high density polyethylene, low density polyethylene, linear low density polyethylene, linear very low density polyethylene and metallocene polyethylene.

7. The method of claim 1 wherein the olefinic polymeric backing further comprises mineral fillers selected from the group consisting of calcium carbonate, magnesium carbonate, calcium sulfate, barium carbonate, barium sulfate, kaolin, pyrogenated silica, aluminum hydrate and expanded graphite.

8. The method of claim 6 wherein the olefinic polymeric backing further comprises mineral fillers selected from the group consisting of calcium carbonate, magnesium carbonate, calcium sulfate, barium carbonate, barium sulfate, kaolin, pyrogenated silica, aluminum hydrate and expanded graphite.

* * * * *